US005853060A

United States Patent [19]

Chao et al.

[11] Patent Number: 5,853,060

[45] Date of Patent: Dec. 29, 1998

[54] AUTOMOTIVE VEHICLE HOOD LATCH RELEASE SYSTEM

[76] Inventors: Yi Jen Chao, 2758 Bay Dr., West Bloomfield, Mich. 48324; James Lee Salmon, P.O. Box 629, Dearborn Heights, Mich. 48217; Patti M. Warren, 21860 Cloverlawn, Oak Park, Mich. 48237

[21] Appl. No.: 726,003

[22] Filed: Oct. 4, 1996

[51] Int. Cl.[6] .......................... B62D 25/12; B60R 25/04; E05C 3/16

[52] U.S. Cl. .................... 180/69.2; 180/89.17; 180/289; 292/216; 292/DIG. 14

[58] Field of Search ............................... 180/69.2, 69.21, 180/89.17, 289; 292/DIG. 14, DIG. 25; 296/146.1

[56] References Cited

U.S. PATENT DOCUMENTS

| | | | |
|---|---|---|---|
| 2,246,791 | 6/1941 | Dall | 180/289 |
| 2,246,792 | 6/1941 | Dall | 180/69.2 |
| 2,256,465 | 9/1941 | Brubaker . | |
| 2,652,552 | 9/1953 | Hueso | 180/289 |
| 2,804,159 | 8/1957 | Gavito | 180/289 |
| 3,504,511 | 4/1970 | Allen | 292/DIG. 14 |
| 3,549,195 | 12/1970 | Kallinikos | 180/289 |
| 3,730,575 | 5/1973 | Arlauskas et al. | 292/216 |
| 3,820,361 | 6/1974 | Leitner | 70/241 |
| 4,382,482 | 5/1983 | Brandle et al. | 180/69.2 |
| 4,478,441 | 10/1984 | Fiordellisi et al. | 292/216 |
| 4,589,514 | 5/1986 | Wilson et al. | 180/289 |
| 4,801,165 | 1/1989 | Pyle | 292/249 |
| 4,872,366 | 10/1989 | Appleby et al. | 74/501.6 |
| 5,048,877 | 9/1991 | Rogers, Jr. et al. | 292/110 |
| 5,150,933 | 9/1992 | Myslicki et al. | 292/216 |
| 5,347,799 | 9/1994 | Hosaka et al. | 56/15.8 |
| 5,445,421 | 8/1995 | Ferrara | 292/216 |
| 5,535,608 | 7/1996 | Brin | 70/256 |
| 5,618,069 | 4/1997 | Konchan et al. | 292/216 |

FOREIGN PATENT DOCUMENTS

| | | | |
|---|---|---|---|
| 152500 | 7/1953 | Australia . | |
| 947440 | 12/1954 | Germany | 180/69.2 |
| 907930 | 3/1961 | United Kingdom . | |
| 2 031 509 | 4/1980 | United Kingdom | 180/69.2 |

*Primary Examiner*—Brian L. Johnson
*Assistant Examiner*—Bridget Avery
*Attorney, Agent, or Firm*—David B. Kelley

[57] ABSTRACT

In an automotive vehicle having a hood covering an underhood area in a front portion of the vehicle and a vehicle body defining a vehicle interior, a hood latch release system has a striker mounted in the underhood area, a primary latch mounted in the underhood area for latching to the striker to retain the hood in substantially flush relationship with the vehicle body, and a secondary latch mounted in the underhood area for latching to the striker when the primary latch is unlatched from the striker. The primary latch and the secondary latch are released from the striker by a cable-operated latch release lever. A cable is connected to the release lever on one end and on the other end is connected to a latch release handle located in a depression in a surface of the vehicle interior coverable by a driver's door when in a closed position so as to prevent movement of the latch release handle, the latch release handle movable to operate the latch release lever when the driver's door is in an open position uncovering the depression.

8 Claims, 4 Drawing Sheets

AUTOMOTIVE VEHICLE HOOD LATCH RELEASE SYSTEM

FIELD OF THE INVENTION

The present invention relates to automotive vehicle hood latching mechanisms in general, and more specifically to hood latching mechanisms releasable from inside the vehicle.

BACKGROUND OF THE INVENTION

Automotive vehicles have long had a hood in the section of the vehicle in front of the passenger compartment to cover an underhood area, which typically contains an engine. In a closed position, the hood is usually flush with adjacent body surfaces to provide a smooth, continuous vehicle body appearance. When access is desired to the underhood area, for example to perform maintenance on the engine contained therein, the hood is moved to an open position. In order to achieve this open position, the hood must be unlatched. A typical vehicle hood latch system has two latches, a first being remotely releasable from the passenger compartment by pulling a lever connected to a cable, which subsequently pulls the first latch to an unlatched position. In order to prevent the hood from moving to an open position and obstructing a driver's forward vision, a second latch it is typically provided to be accessible from an area in the front of the vehicle, thus requiring that a individual be stationed in front of the vehicle in order to open the hood. A normal sequence for opening the hood of a vehicle would thus be to operate the first latch from within the vehicle compartment, which would allow the hood to open a predetermined distance. The person would then exit the vehicle and go to the front area, whereupon the second latch would then be disengaged manually by positioning a hand beneath the hood and operating the second latch directly.

Hood latch release mechanisms are known in which the unlatching movement of the first latching mechanism and release of the second latching mechanism can be accomplished from within the vehicle passenger compartment, so that it is unnecessary to reach into the hood through a predetermined cover opening to release the second latch, as described above. Such a mechanism was disclosed in U.S. Pat. No. 2,256,465 (Brubaker). While such a mechanism prevents the inconvenience of having to reach beneath the hood, it also increases the risk of inadvertently unlatching the hood and obstructing the driver's view. There is thus a need for a hood latch release system in which both the primary and secondary latches may be released from within the vehicle passenger compartment, but which prevents inadvertent release of the hood.

SUMMARY OF THE INVENTION

In response to the deficiencies of the related art, the present invention provides a hood latch release system for an automotive vehicle having a hood covering and underhood area in a front portion of the vehicle and a vehicle body defining a vehicle interior therein. The hood latch release system has a striker mounted in the underhood area, for example to an underside of the hood, a primary latch mounted in the underhood area for latching to the striker to retain the hood in substantially flush relationship with the vehicle body, a secondary latch mounted in the underhood area for latching to the striker when the primary latch is unlatched therefrom, a latch release for releasing the primary latch and the secondary latch from the striker, and a latch release handle connected to the latch release and located in the depression in a surface of the vehicle interior coverable by a driver's door when in a closed position so as to prevent movement of the latch release handle, the latch release handle moveable to operate the latch release when the driver's door is in an open position uncovering the depression. Preferably, the depression is located in an instrument panel surface coverable by the driver's door when in a closed position.

An advantage of the present invention is a hood latch release system in which the hood may be released from inside the passenger compartment of the vehicle while assuring that the hood will not inadvertently be released.

A feature of the present invention is a hood latch release system in which the latch release handle is located in a depression in a surface of the vehicle interior coverable by the driver's door when the door is in a closed position, so as to prevent movement of the latch release handle and thus avoid unintentional release of the hood until the driver's door is moved to an open position uncovering the latch release handle.

BRIEF DESCRIPTION OF THE DRAWINGS

These and other objects, advantages, and features of the present invention will be apparent to those skilled in the automotive hood latching arts upon reading the following description with reference to the accompanying drawings, in which.

DETAILED DESCRIPTION OF THE PREFERRED EMBODIMENT

Figure 1:
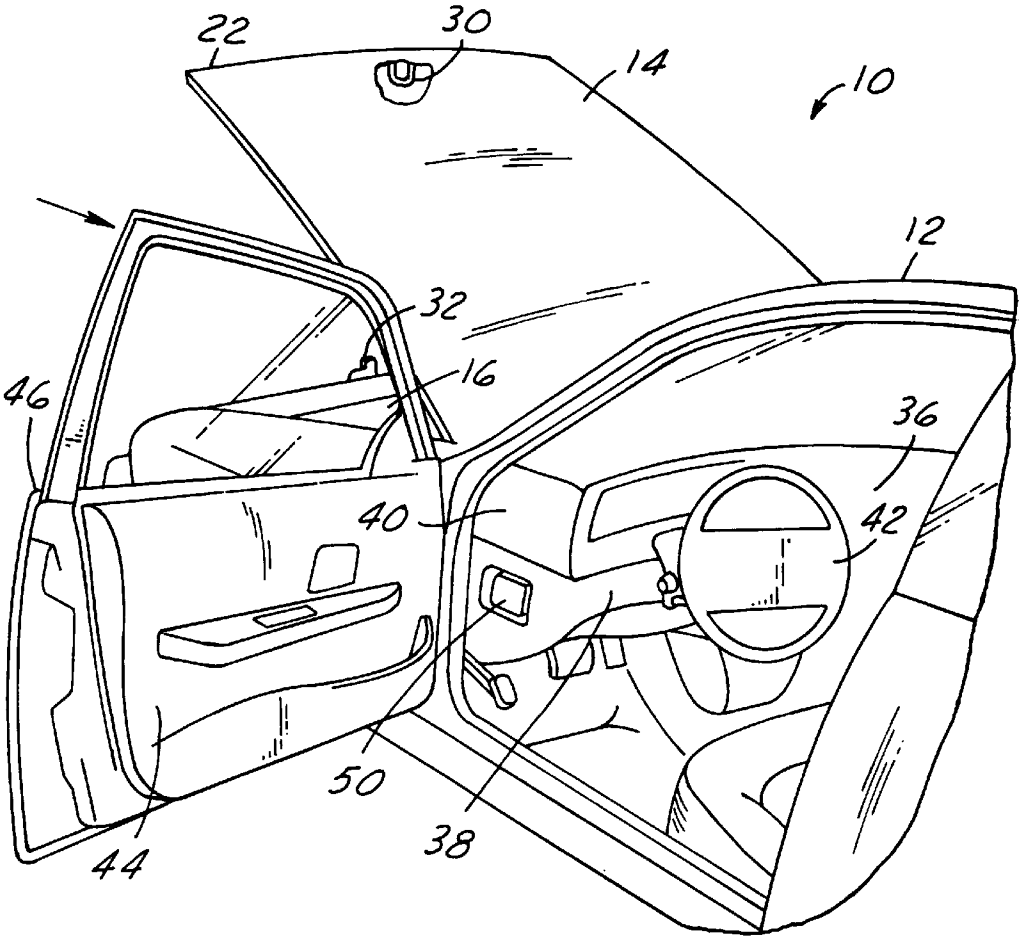
FIG. 1 is a perspective view of an automotive vehicle showing a front door opening to an interior passenger compartment with a hood latch release handle in a door mating surface of an instrument panel in accordance with an embodiment of the present invention.
Figure 2:
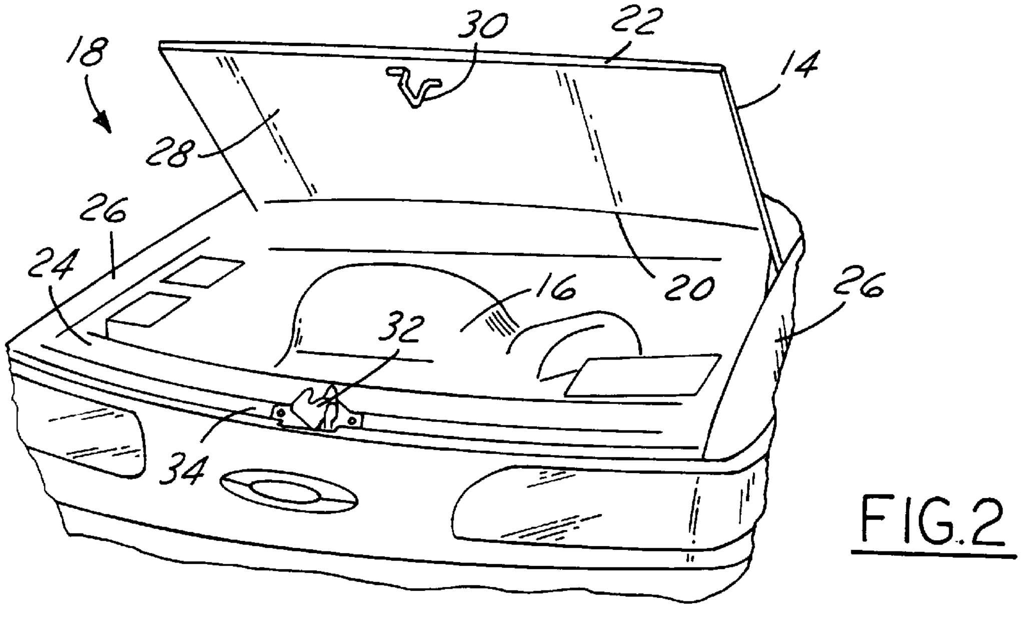
FIG. 2 is a front perspective of a vehicle showing a hood for covering an underhood area and having a striker mounted thereto for interaction with a remotely operated hood release lever in accordance with the present invention.

Turning now to the drawings, and in particular to FIGS. 1 and 2 thereof, an automotive vehicle 10 is shown as having a vehicle body surface 12 a portion of which has a hood 14 for covering an underhood 16 in a front portion 18 of the vehicle 10. The hood 14 is preferably pivotably mounted along a rear edge 20 for movement between a cover position (not shown) covering the underhood area 16, and an open position in which a forward edge 22 of the hood 14 rises substantially above a mating surface 24 and adjacent body surfaces 26 so as to allow access to the under area 16. Those skilled in the art will recognize that the hood 14 may be mounted in other ways, for example with the front edge 22 as the pivot edge so that the rear edge 20 rises above the surrounding surfaces, and that the present invention is not limited to the hood arrangements show in FIGS. 1 and 2.

Still referring to FIGS. 1 and 2, on an under side 28 of the hood 14 is mounted a striker 30 for interaction with a latch mechanism 32, as further described below. The latch mechanism 32 is preferably mounted on a radiator support 34 in the underhood area 16, but can be mounted in another area. Those skilled in the art will recognize that the mounting locations of the striker 30 and the latch mechanism 32 may be interchanged, that is, the latch mechanism may be mounted on the under side 28 of the hood 14 and the striker 30 may be mounted at a location in the underhood area 16. It should be understood that the present invention is not to be limited by the striker 30 and latch mechanism 32 locations of FIGS. 1 and 2.

Figure 3:
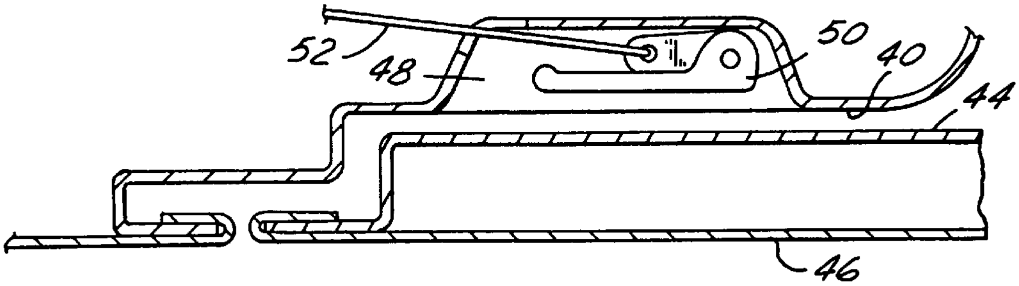
FIG. 3 is a cross sectional view through an instrument panel of the automotive vehicle and a vehicle door shown in a closed position abutting the instrument panel surface so as to cover a depression containing a hood latch release handle so as to prevent operation thereof.
Figure 4:
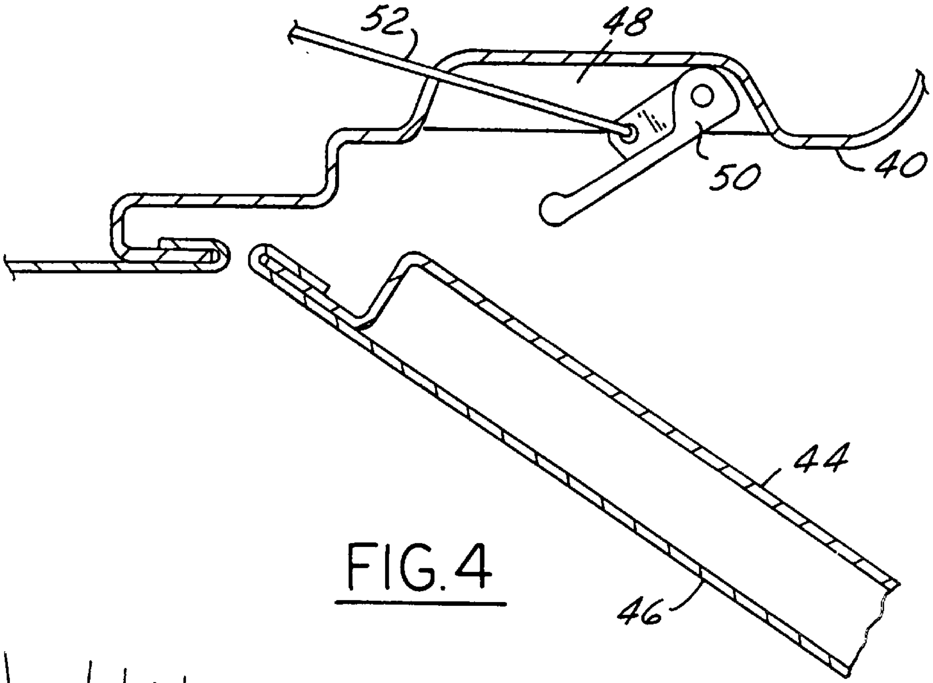
FIG. 4 is a cross sectional view similar to FIG. 3 but showing the vehicle door in an open position uncovering the depression containing the hood latch release handle so as to permit operation thereof.
Figure 5:
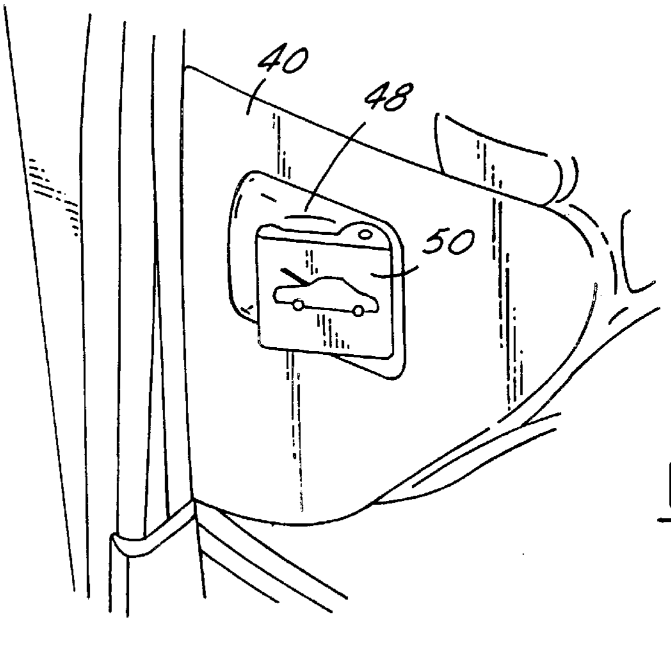
FIG. 5 is a perspective view of the hood latch release handle shown projecting from the depression in the instrument panel surface when moved to operate the hood latch release.

The vehicle body 12 defines a vehicle interior 36 (FIG. 1) such as a passenger compartment. Within the vehicle interior 36 is an instrument panel 38 having various surfaces, including a lateral surface 40 which is located on a driver's side of the front seating area of the vehicle 12 near a steering wheel 42. The surface 40 is adjacent to a trim panel 44 of a driver's door 46, which in conventional fashion, is movable between an open position (FIG. 1 and 4) and a closed position (FIG. 3).

As best seen in 3–5, the surface 40 of the instrument panel 38 has a depression 48 therein which receives a release handle 50. The release handle 50 has a first position substantially contained in the depression 48 in (FIG. 3) so as to be inaccessible from the vehicle interior 36 when the driver's door 46 is in the closed position. Thus, the release handle can not be moved when the driver's door is closed thereby preventing opening of the hood 14. When the driver's door 46 is in the open position (FIG. 4), the release handle can be moved to a second position projecting from the depression 48 so as to pull on the cable 52 to actuate the latch mechanism 32 as is further described below. The hood 14 can therefore be opened only when the driver's door 46 is in the open position to allow access to the release handle 50, thus providing security against inadvertent opening of the hood 14.

Figure 6:
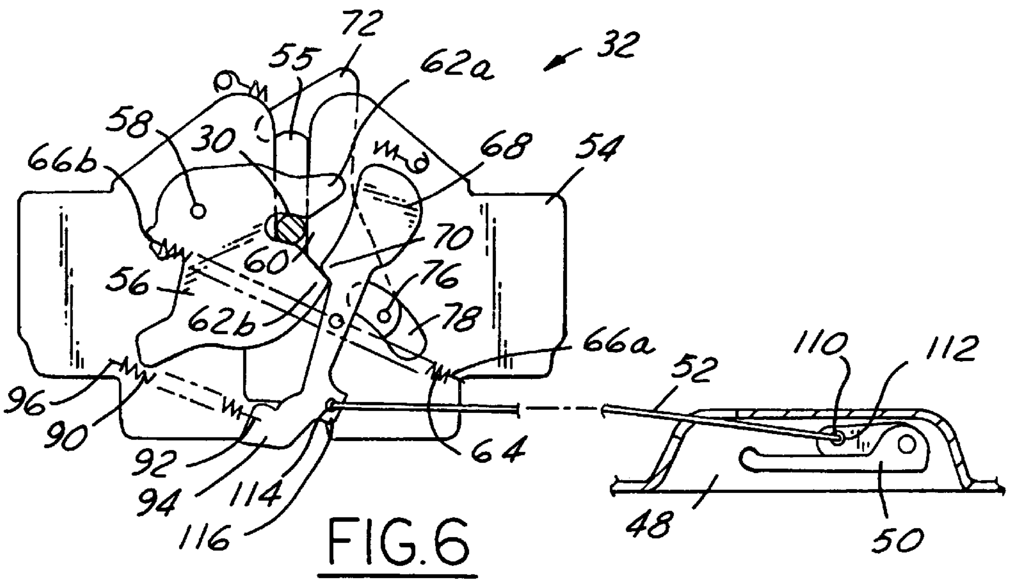
FIG. 6 is a front view of a hood latch release shown with a primary latch retaining a striker and the hood latch release handled contained in an instrument panel depression.
Figure 8:
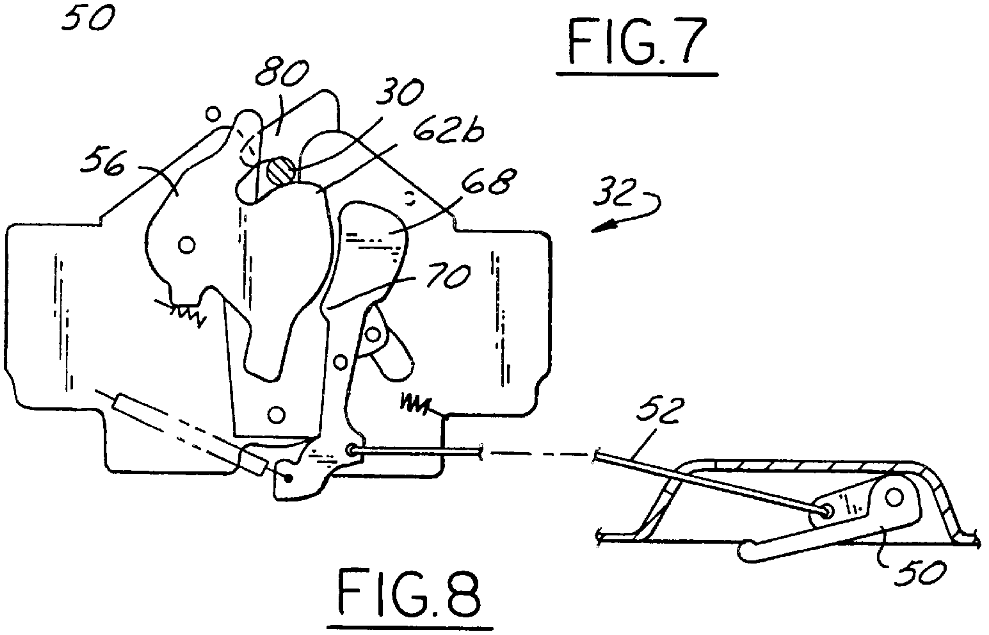
FIG. 8 is a front view of a hood latch similar to FIG. 6, but showing the primary latch released and the secondary latch retaining the striker, the latch release handle shown projecting from the depression in the instrument panel.

Referring now to FIG. 6, the latch mechanism 32 is shown having a latch mounting plate 54 to which a primary latch 56 is pivotally attached at the pivot point 58. A primary latch 56 has a primary latch slot 60 defined by a pair of opposed latched fingers 62*a*, 62*b*. In a latch position, as seen in FIG. 6, the primary latch 56 retains the striker 30 within the latch slot 60 by the latch finger 62*a*. The primary latch 56 is biased to rotate counterclockwise about the pivot point 58 to an unlatched position in which the striker 30 is unlatched therefrom (FIG. 8). Preferably, the biasing force is provided by a spring 64 attached on one end 66a to the latch mounting plate 54 and the other end 66*b* to the primary latch 56.

The latch mounting plate 54 has a striker slot 55 extending in a generally vertical direction, it being understood that vertical for purposes of FIG. 6 is from the top of the page to the bottom of the page. The striker slot 55 receives the striker 30 when the hood 14 is moved to the closed position.

As seen in FIG. 6, a release lever 68 is pivotably mounted to the latch mounting plate 54 and has a primary latch hold position in which the primary latch 56 is maintained in the latch position. The primary hold latch position of the release lever 68 is effected by a spur 70 mating with the finger 62*b* of the primary latch 56 to hold the latter against the counterclockwise rotation of the biasing force of spring 64. The cable 52 is preferably connected on a first end 110 to an eyelet 112 of the release handle 50, and on a second end 114 to a shield 116 of the release lever 68 (FIG. 6).

Figure 7:
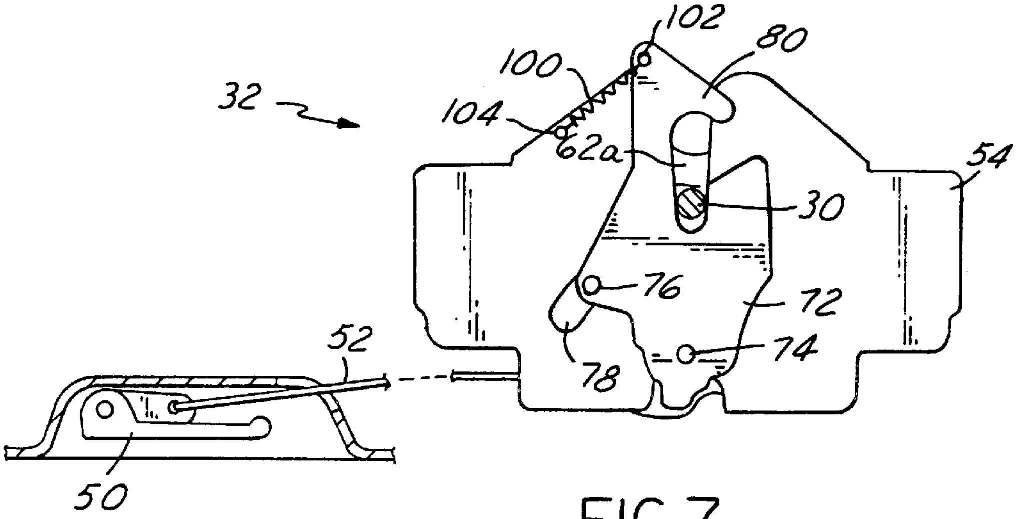
FIG. 7 is a rear view of the hood latch of FIG. 6.

As seen from the opposite side of the latch mechanism 32 in FIG. 7, the latch mounting plate 54 has a secondary latch 72 pivotably mounted thereto around a pivot point 74. The secondary latch 72 has actuated pin 76 fixed thereto which extends through a pin slot 78 in the latch mounting plate 54 so as to be contactable by the release lever 68 on the opposite side of the latch mounting plate 54. A secondary latch 72 also has a hook member 80 for obstructing movement of the striker 30 out of the striker slot 55 when the secondary latch 72 is in a lock position (FIGS. 7 and 8).

Figure 9:
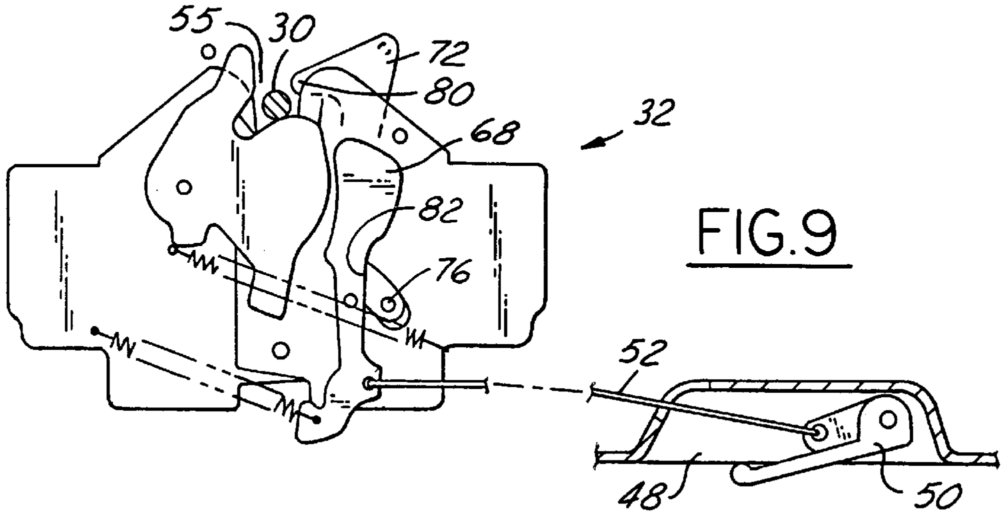
FIG. 9 is a view similar to FIG. 6 but showing a secondary latch released from the striker.
Figure 10:
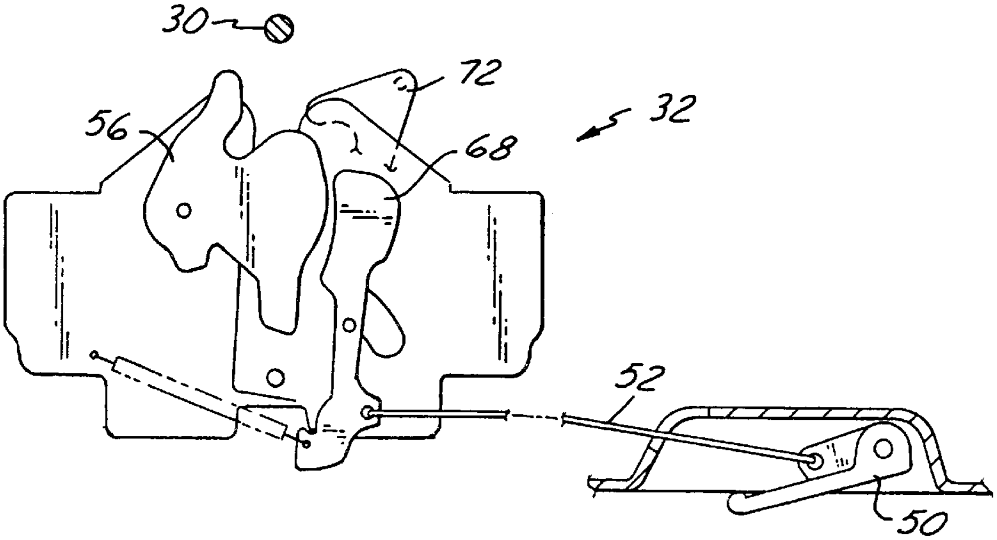
FIG. 10 is a front view similar to FIG. 9, but showing the striker in a position away from the primary and secondary latches.
Figure 11:
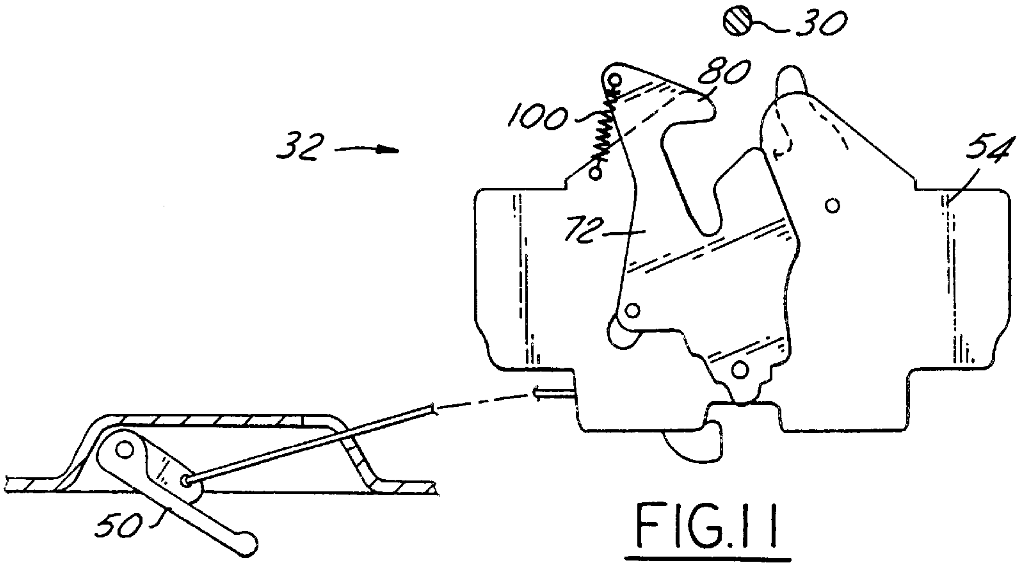
FIG. 11 is a rear view of FIG. 10.

Operation of the hood latch release system of the present invention is accomplished as follows. When the hood 14 is in a closed position, the striker 30 is retained in the striker slot 55 by the primary latch 56 (FIG. 6). With the driver's door 46 in a closed position (FIG. 3), the hood 14 cannot be opened since access to the release handle 50 is obstructed by the driver's door 46. Thus, inadvertent opening of the hood 14 is obviated, for example, when the vehicle 10 is being driven. When access is desired to the underhood area 16, that is, when the hood 14 is to be opened, the driver's door 46 must be moved to the open position (FIGS. 1 and 4) so that the release handle 50 may be accessed. With the driver's door 46 in the open position, the release handle 50 is moved from a first position substantially contained in the depression 48 (FIG. 6) to a second position (FIG. 8) in which the cable 52 pulls on the release lever 68 so as to disengage the spur 70 from the latch finger 62*b* of the primary latch 56. The primary latch 56 thus rotates in a counterclockwise direction and the striker 30 moves upwardly in the striker slot 55 until being obstructed by the hook member 80 of the secondary latch 72, the release lever 68 being moved to the primary latch release position releasing the primary latch to the unlatch position. Upon further pulling outwardly of the release handle 50 to a third position, the cable 52 further rotates the release lever 68 in the counterclockwise direction (as seen in FIG. 9) until an abutting surface 82 thereof contacts the actuator pin 76 so as to move the secondary latch 72 to a position (FIG. 9) in which the hook member 80 does not obstruct the movement of the striker 30 from the striker slot 55. Once the hook member 80 no longer obstructs the striker slot 55, the striker 30 can move away therefrom (FIGS. 10 and 11), thus allowing the hood 14 to open (FIG. 2).

The latch fingers 62*a*, 62*b* preferably have cammed surfaces in order to allow easy movement of the striker 30 and the spur 70, respectfully, there against.

The release lever 68 is biased to the primary latch hold position (FIG. 6) by a spring 90 having a first end 92 attached to a toe 94 of the release lever 68 and a second end 96 attached to the latch mounting plate 54. The secondary latch 72 is biased to the lock position (FIG. 7) by a spring 100 attached on a first end 102 to the secondary latch 72 and on a second end 104 to the latch mounting plate 54.

Although the preferred embodiment of the present invention has been disclosed, various changes and modifications may be made without departing from the scope of the invention as set forth in the appended claims.

We claim:

1. A hood latch release system for an automotive vehicle having a hood covering an underhood area in a front portion of the vehicle and a vehicle body defining a passenger compartment therein, the system comprising:

a striker mounted on an underside of the hood;

a latch mounting plate mounted in the underhood area;

a primary latch mounted to the latch mounting plate and movable to a latch position in which the striker is retained by the primary latch and biased to an unlatch position in which the striker is unlatched therefrom;

a secondary latch mounted to the latch mounting plate and having a lock position in which the striker is obstructed from movement out of the latch mounting plate and an unlock position in which movement of the striker from the mounting plate is not obstructed by the secondary latch;

a release lever pivotably mounted to the latch mounting plate for movement between a primary latch hold position maintaining the primary latch in the latch position, a primary latch release position releasing the primary latch to move to the unlatch position, and a secondary latch release position in which the secondary latch is moved to the unlock position;

a release handle adapted to be, located in a depression in a surface of the passenger compartment coverable by the driver's door when in a closed position, the release handle movable between a first position substantially contained in the depression so that the release lever is maintained in the primary latch position, a second position in which the release handle projects from the depression and the release lever is moved to the secondary latch position, and a third position in which the release handle projects from the depression and the release lever is moved to the secondary latch release position; and a cable having a first end connected to the release lever and a second end connected to the release handle.

2. A hood latch release system according to claim 1 wherein the latch mounting plate is attached to a radiator support in the underhood area.

3. A hood latch release system according to claim 1 wherein the release lever is biased to the primary latch hold position.

4. A hood latch release system according to claim 1 wherein the secondary latch has an actuator pin thereon adjacent the release lever for interaction therewith to move the secondary latch to the unlock position when the release lever is moved to the secondary latch release position.

5. A hood latch release system according to claim 4 wherein the latch housing has a striker slot therein for receiving the striker.

6. A hood latch release system according to claim 5 wherein the primary latch has a primary latch slot defined by a pair of opposed latch fingers and is pivotally mounted to the latch housing so that the striker is retained in the latch slot by one of the pair of fingers when the primary latch is in the latch position, the one of the pair of latch fingers releasing the striker when the primary latch is moved to the unlatch position.

7. A hood latch release system according to claim 6 wherein the secondary latch is pivotally mounted to the latch housing and has a hook member obstructing movement of the striker out of the striker slot when the secondary latch is in the lock position, the hook member movable so as to allow movement of the striker from the striker slot when the secondary latch is in the unlock position.

8. A hood latch release system according to claim 7 wherein the primary latch and the release lever are mounted on a first side of the latch housing, the secondary latch is mounted to a second side of the latch housing, and the actuator pin extends from the secondary latch through a pin slot in the latch housing so as to be contactable by the release lever.

* * * * *